(12) United States Patent
Tsubouchi (10) Patent No.: US 6,213,569 B1
(45) Date of Patent: Apr. 10, 2001

(54) PRESSURE GENERATOR

(75) Inventor: Kaoru Tsubouchi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/239,514

(22) Filed: Jan. 29, 1999

(30) Foreign Application Priority Data

Jan. 29, 1998 (JP) .................................................. 10-017357

(51) Int. Cl.[7] .................................. F15B 9/10; B60T 8/34
(52) U.S. Cl. ..................... 303/114.3; 91/369.2; 91/376 R
(58) Field of Search ........................... 60/547.1; 91/369.2, 91/376 R; 303/114.3

(56) References Cited

U.S. PATENT DOCUMENTS

| | | | | |
|---|---|---|---|---|
| 5,350,224 | * | 9/1994 | Nell et al. ........................... | 303/113.3 |
| 5,704,270 | * | 1/1998 | Tsubouchi ........................... | 91/376 R |
| 5,787,789 | * | 8/1998 | Suzuki ................................ | 91/376 R |
| 5,839,344 | * | 11/1998 | Tsubouchi ........................... | 91/376 R |
| 5,845,556 | * | 12/1998 | Tsubouchi et al. ................... | 91/367 |
| 5,890,775 | * | 4/1999 | Tsubouchi et al. ............... | 303/114.3 |
| 5,992,947 | * | 11/1999 | Tsubouchi ........................ | 303/114.3 |
| 6,065,291 | * | 5/2000 | Tsubouchi ........................... | 60/547.1 |
| 6,065,388 | * | 5/2000 | Tsubouchi et al. ................. | 91/369.2 |

FOREIGN PATENT DOCUMENTS

| | | |
|---|---|---|
| 2-274649 | 11/1990 | (JP) . |
| 9-123896 | 5/1997 | (JP) . |

* cited by examiner

Primary Examiner—Christopher P. Schwartz
(74) Attorney, Agent, or Firm—Burns, Doane, Swecker & Mathis, LLP (57) ABSTRACT

A pressure generator having a more efficient design and simple construction, and providing improved assembly efficiency and reduced cost includes a housing, a power piston which divides the inside of the housing into front chambers and rear chambers, an input member, a valve mechanism, an output rod, an auxiliary movable wall, an auxiliary variable pressure chamber, an electromagnetic valve unit, a master cylinder and a piston. The auxiliary variable pressure chamber is bounded by an auxiliary movable wall and a first movable wall.

11 Claims, 6 Drawing Sheets

PRESSURE GENERATOR

This application corresponds to and claims priority under 35 U.S.C. § 119 with respect to Japanese Application No. 10(1998)-17357 filed on Jan. 29, 1998, the entire content of which is incorporated herein by reference.

SUMMARY OF THE INVENTION

This invention generally relates to a pressure generator. More particularly, the present invention pertains to a pressure generator used in a motor vehicle for generating a braking force.

BACKGROUND OF THE INVENTION

Japanese Unexamined Patent Publication No. Hei.9-123896 discloses a pressure generator that includes a housing in which is formed a pressure chamber, and a power piston disposed inside the pressure chamber for advancing and retreating movement with respect to the housing, with the power piston being provided with a movable wall which divides the pressure chamber into a front chamber connected to a vacuum source and a rear chamber selectively connected to the vacuum source or the atmosphere. A valve housing is attached to the movable wall, and an input member is disposed inside the valve housing for advancing and retreating movement with respect to the valve housing, with the input member being movable by operation of a brake operation. A valve mechanism is disposed inside the valve housing and has a vacuum valve for connecting the rear chamber with the front chamber, corresponding to movement of the input member, and an atmospheric air valve for connecting the rear chamber with the atmosphere, corresponding to movement of the input member. An output member outputs pressure from the pressure generator generated in conjunction with movement of the movable wall, and an auxiliary movable wall is disposed inside the front chamber and is engageable with the output member for advancing and retreating movement. An isolating member is connected with the auxiliary movable wall to form an auxiliary variable pressure chamber between the auxiliary movable wall and the movable wall, and a switching device selectively connects the auxiliary variable pressure chamber with the vacuum source or the atmosphere.

However, in this pressure generator, an auxiliary movable wall and an isolating wall are necessary for forming the auxiliary variable pressure chamber. Consequently, the pressure generator has a large number of parts and suffers from having poor assembly efficiency and high cost.

In light of the foregoing, a need exists for a pressure generator that is not susceptible to the same disadvantages and drawbacks as other known pressure generators such as those described above.

It would thus be desirable to provide a pressure generator having a relatively simple construction and improved assembly efficiency, yet which is not as expensive to produce.

SUMMARY OF THE INVENTION

The present invention provides a pressure generator that includes a housing in which is formed at least one pressure chamber, and a power piston disposed inside the pressure chamber for advancing and retreating movement with respect to the housing. The power piston includes a movable wall and which divides the pressure chamber into a front chamber connected to a vacuum source and a rear chamber selectively connected to the vacuum source or the atmosphere. A valve housing is attached to the movable wall, and an input member is disposed inside the valve housing for advancing and retreating movement with respect to the valve housing upon brake operation. A valve mechanism is disposed inside the valve housing and has a vacuum valve for connecting the rear chamber with the front chamber corresponding to movement of the input member and an atmospheric air valve for connecting the rear chamber with the atmosphere corresponding to movement of the input member. An output member outputs pressure from the pressure generator in conjunction with movement of the movable wall, and an auxiliary movable wall is disposed inside the front chamber for advancing and retreating movement. An auxiliary variable pressure chamber is contained inside the front chamber by the auxiliary movable wall and the movable wall, and a switching device selectively connects the auxiliary variable pressure chamber with the vacuum source or the atmosphere. A cylinder body having a cylinder bore is mounted in the front part of the housing, and a piston adapted to advance and retreat is located in the cylinder bore to form in front of the piston a pressure chamber. The piston is engageable with the output member and moves inside the cylinder bore along with movement of the auxiliary movable wall.

According to another aspect of the invention, a pressure generator includes a housing in which is formed at least one pressure chamber, a partition wall member disposed inside the pressure chamber and dividing the inside of the pressure chamber into a front side pressure chamber and a rear side pressure chamber, and a power piston having a front side movable wall disposed inside the front side pressure chamber for advancing and retreating movement with respect to the housing. The front side movable wall divides the front side pressure chamber into a first front chamber connected to the vacuum source and a first rear chamber selectively connected to the vacuum source or to the atmosphere. The power piston also includes a rear side movable wall disposed inside the rear side pressure chamber for advancing and retreating movement with respect to the housing. The rear side movable wall divides the rear side pressure chamber into a second front chamber connected to the vacuum source and a second rear chamber selectively connected to the vacuum source or to the atmosphere. The power piston further includes a valve housing attached to both of the movable walls. An input member is disposed inside the valve housing for advancing and retreating movement with respect to the valve housing and is movable by brake operation. A valve mechanism is disposed inside the valve housing and has a vacuum valve for connecting both of the rear chambers with both of the front chambers in correspondence with movement of the input member and an atmospheric air valve for connecting both of the rear chambers with the atmosphere in correspondence with movement of the input member. An output member outputs outside the pressure generator a thrust force of the valve housing accompanying movement of the two moving walls, and an auxiliary moving wall is disposed inside the first front chamber for advancing and retreating movement. An auxiliary variable pressure chamber is bounded inside the first front chamber by the auxiliary movable wall and the first movable wall. A switching device selectively connects the auxiliary variable pressure chamber with the vacuum source or the atmosphere. A cylinder body having a cylinder bore is mounted in a front part of the housing and a piston is locates in the cylinder bore. The piston is adapted to move in an advancing and retreating fashion and forms in front of the piston a pressure chamber. The piston is engageable with the output member and is moved inside the cylinder bore along with movement of the auxiliary movable wall.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE INVENTION

Figure 1:
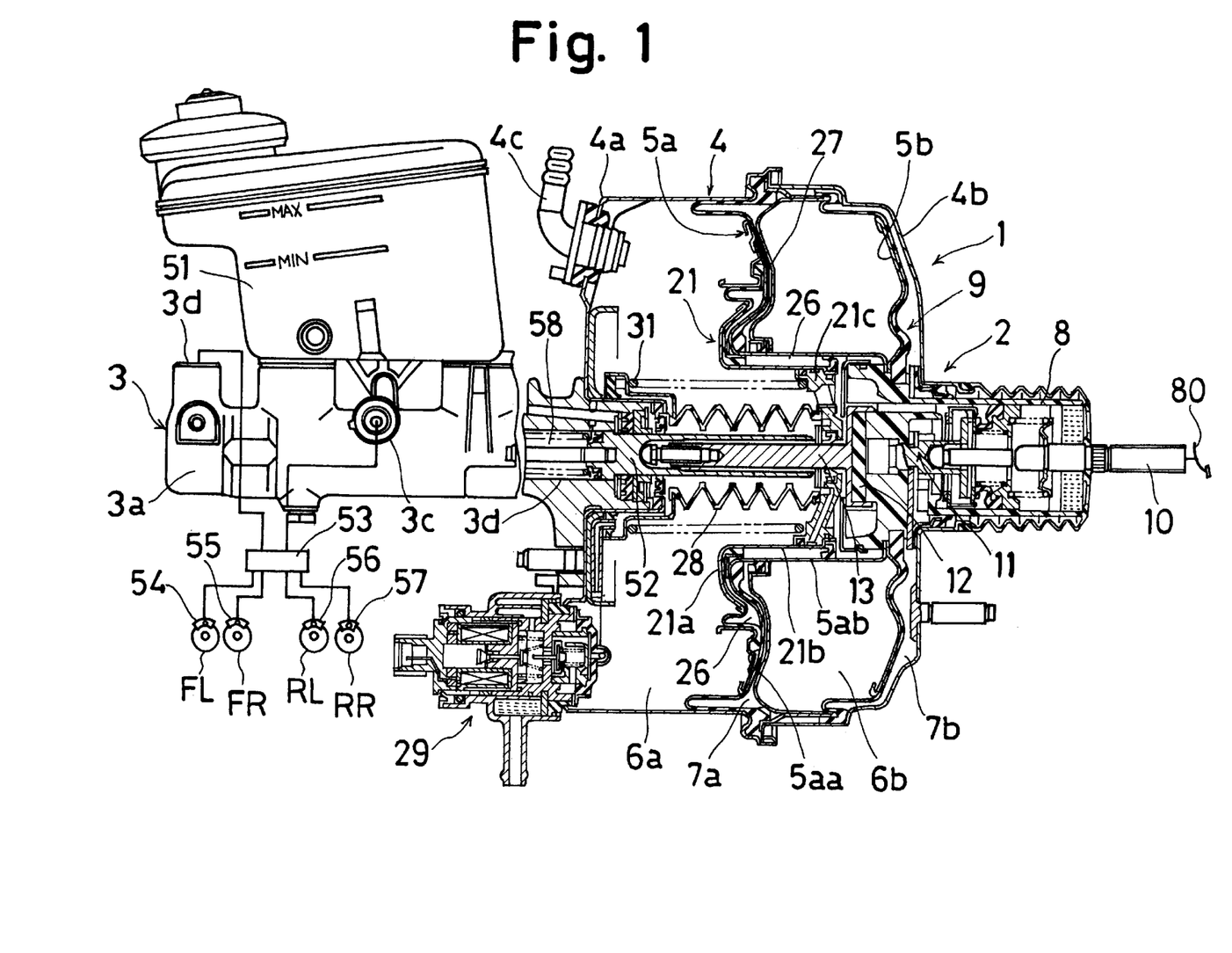
FIG. 1 is a cross-sectional view of a hydraulic pressure generator, including a vacuum booster, according to the present invention.
Figure 2:
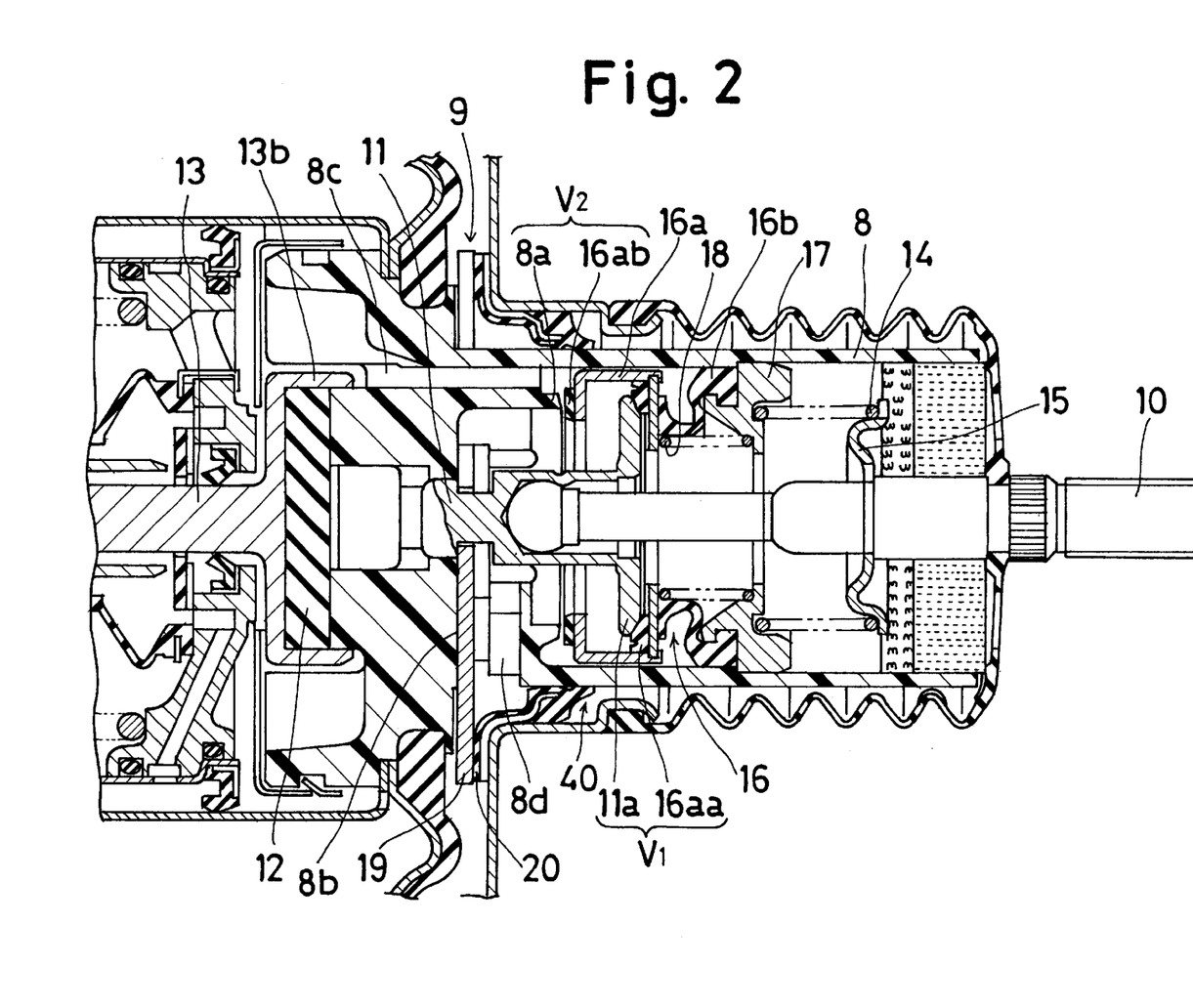
FIG. 2 is an enlarged cross-sectional view of the valve mechanism part of the vacuum booster shown in FIG. 1.

With reference initially to FIGS. 1 and 2, the hydraulic pressure generator 1 according to the present invention includes a vacuum booster 2 and a master cylinder 3. A reservoir tank 51 is connected to the master cylinder 3. An actuator part 53 for effecting an anti-lock braking system (ABS), traction control (TRC) and brake control for steering is connected by hydraulic piping to the master cylinder 3. A plurality of wheel cylinders 54, 55, 56, 57 mounted in respective vehicle wheels FL, FR, RL, PR are connected by hydraulic piping to the actuator part 53.

The vacuum booster 2 includes a housing 4 defined by a front shell 4a constituting a front side part (the left side in FIG. 1) and a rear shell 4b side part (the right side in FIG. 1). A pressure chamber inside the housing 4 is divided by a partition wall 27 that divides the pressure chamber into a front side pressure chamber and a rear side pressure chamber. A first movable wall 5a is disposed in the front side pressure chamber within the housing 4 and is fixed in an airtight manner along its periphery for movement in the forward and rearward directions (i.e., the left-right directions in FIG. 1), and a second movable wall 5b is disposed in the rear side pressure chamber and is fixed in an airtight manner along its periphery for movement in the forward and rear directions.

The front side pressure chamber of the housing 4 is divided in an airtight manner by the first movable wall 5a into a first front chamber 6a and a first rear chamber 7a chamber and the rear side pressure chamber of the housing 4 is divided in an airtight manner by the second movable wall 5b into a second front chamber 6b and a second rear chamber 7b.

A valve housing 8 made of a resin material is inserted into the rear of the housing 4, and both the first movable wall 5a and the second movable wall 5b are fixed in an airtight manner at their inner peripheries to the valve housing 8. The movable walls 5a, 5b and the valve housing 8 form a power piston 9 which moves in the forward and rearward directions inside the housing 4.

An input rod 10 is located in the valve housing 8 and has a rear end that is connected to a brake pedal 80 as seen in FIG. 1. The input rod 10 is also connected to an input member 11 so that the input rod 10 and the input member 11 move integrally together as a unit.

The input member 11 is movably disposed in the valve housing 8 for movement in the forward and rearward directions (i.e., the left-right direction in FIG. 2). The input member 11 transmits an input force from the input rod 10 to a reaction disc 12. An output rod 13 abuts against the reaction disc 12 and receives an input force by way of the reaction disc 12. The output rod 13 in turn moves a piston 52 of the master cylinder 3 in the forward direction.

A first retainer 15 receives the urging force of a return spring 14 and is mounted or fixed to the input rod 10. A second retainer 17 supports the rear end part 16b of a control valve 16 and is fixed to the valve housing 8. The second retainer 17 receives a spring force from the input rod 10 by way of the first retainer 15 and the return spring 14.

The inner periphery of the rear end part 16b of the control valve 16 engages the second retainer 17, and the outer periphery of the control valve 16 forms a seal with the inner surface of the valve housing 8. A valve spring 18 is interposed between the second retainer 17 and a retainer supporting a seal part 16a, which forms a front part of the control valve 16.

As a result of the construction described above, when the input rod 10 is in a non-operating state, an air valve part 16aa of the seal part 16a of the control valve 16 engages an air valve seat 11a formed on the rear end of the input member 11. When the input rod 10 is in an operating state, a vacuum valve part 16ab of the seal part 16a of the control valve 16 engages a vacuum valve seat 8a provided on the valve housing 8. That is, the air valve part 16aa and the air valve seat 11a constitute an atmospheric air valve $V_1$, and the vacuum valve part 16ab and the vacuum valve seat a constitute a vacuum valve $V_2$. The control valve 16, the air valve seat 11a of the input member 11, and the vacuum valve seat 8a of the valve housing 8 together constitute a valve mechanism 40.

A key 19 is inserted into a key groove 8b provided in the valve housing 8, and in the non-operating state abuts upon the housing 4 by way of a damper member 20. A vacuum passage 8c for connecting the first front chamber 6a with the vacuum valve $V_2$ and an air passage 8d for connecting the second rear chamber 7b with the atmospheric air valve V are formed in the valve housing 8. A front chamber side opening of the vacuum passage 8c, which opens into the first front chamber 6a, is formed in the front end of the valve housing 8, and a rear chamber side opening of the air passage 8d, which opens into the second rear chamber 7b, is formed in the side face of the valve housing 8.

Figure 3:
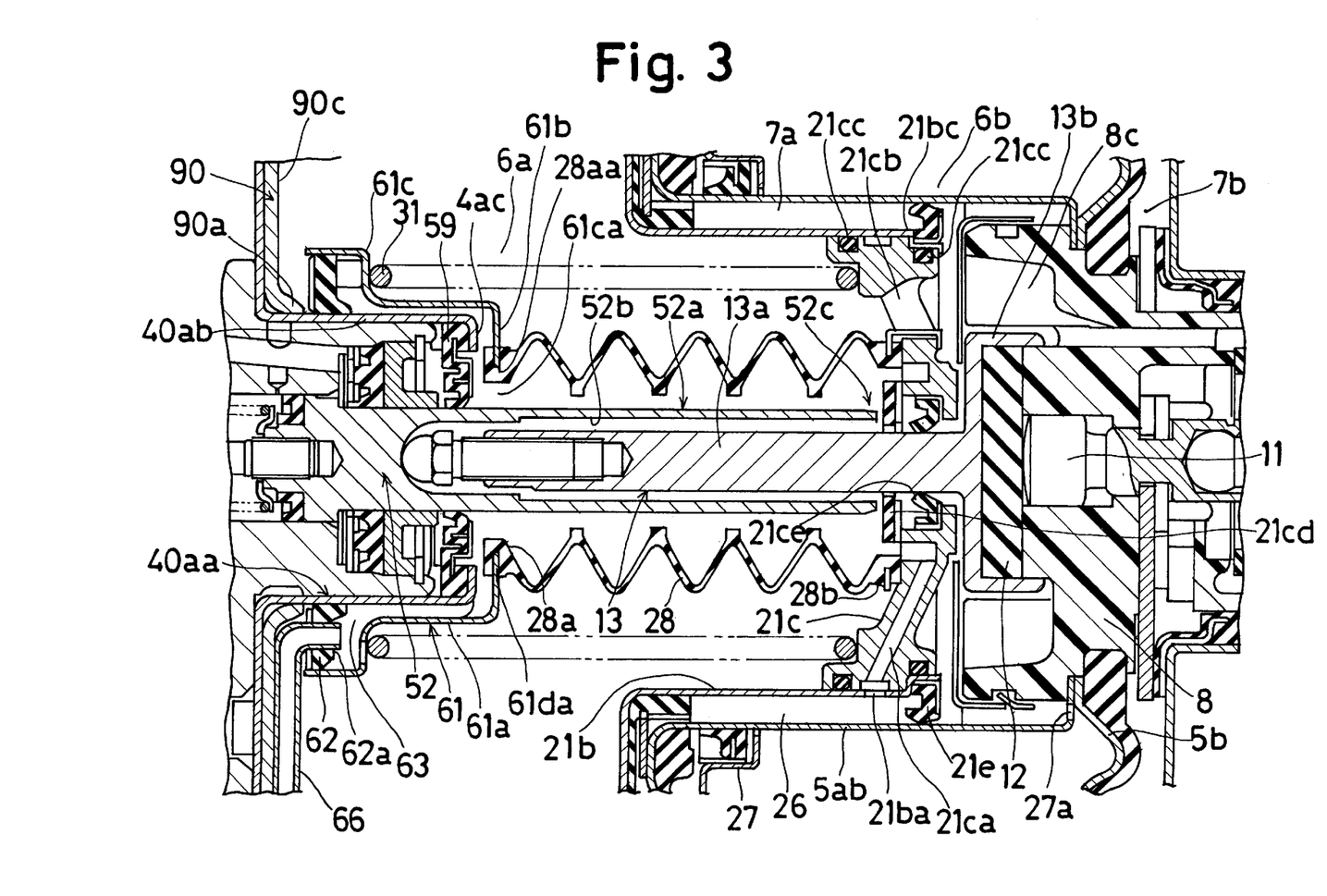
FIG. 3 is an enlarged cross-sectional view of the output rod portion of the vacuum booster shown in FIG. 1.

As shown in FIG. 3, the output rod 13 has a rod-shaped shaft part 13a at its front side (i.e., the left side in FIG. 3) and a cuplike part 13b at its rear side (i.e., the right side in FIG. 3). The cuplike part 13b of the output rod 13 receives the reaction disc 12 and also receives the front end of the valve housing 8.

As shown in FIG. 1, the master cylinder 3 includes a cylinder body 3a. The rear end portion of the cylinder body 3a is fitted in a liquid-tight manner into a substantially cylindrical recess part 40aa formed in the middle of the front face of the housing 4 which projects toward the first front chamber 6a.

The cylinder body 3a of the master cylinder 3 is provided with a cylinder bore 3d extending in the front-rear direction. A first piston 52 and a second piston (not specifically shown in FIG. 1) are positioned in an opening part and a middle part of the cylinder bore 3d, respectively, for back and forth sliding movement. As seen in FIG. 1, defined within the cylinder bore 3d are a first pressure chamber 58 formed by the first piston 52 and the second piston, and a second pressure chamber (not specifically shown in FIG. 1) formed by the second piston and the bottom face of the cylinder body 3a.

As seen in FIG. 3, the first piston 52 has an extension part 52a projecting from a rear opening of the cylinder body 3a and extending through a seal member 59 into the first front chamber 6a of the housing 4. The first piston 52 also has a longitudinally extending recess or blind hole 52b that opens at the rear end face of the extension part 52a. The shaft part 13a of the output rod 13 is located in the recess 52b of the first piston 52, and the front end of the output rod 13 is adapted to abut against the bottom part of the recess 52b.

Figure 4:
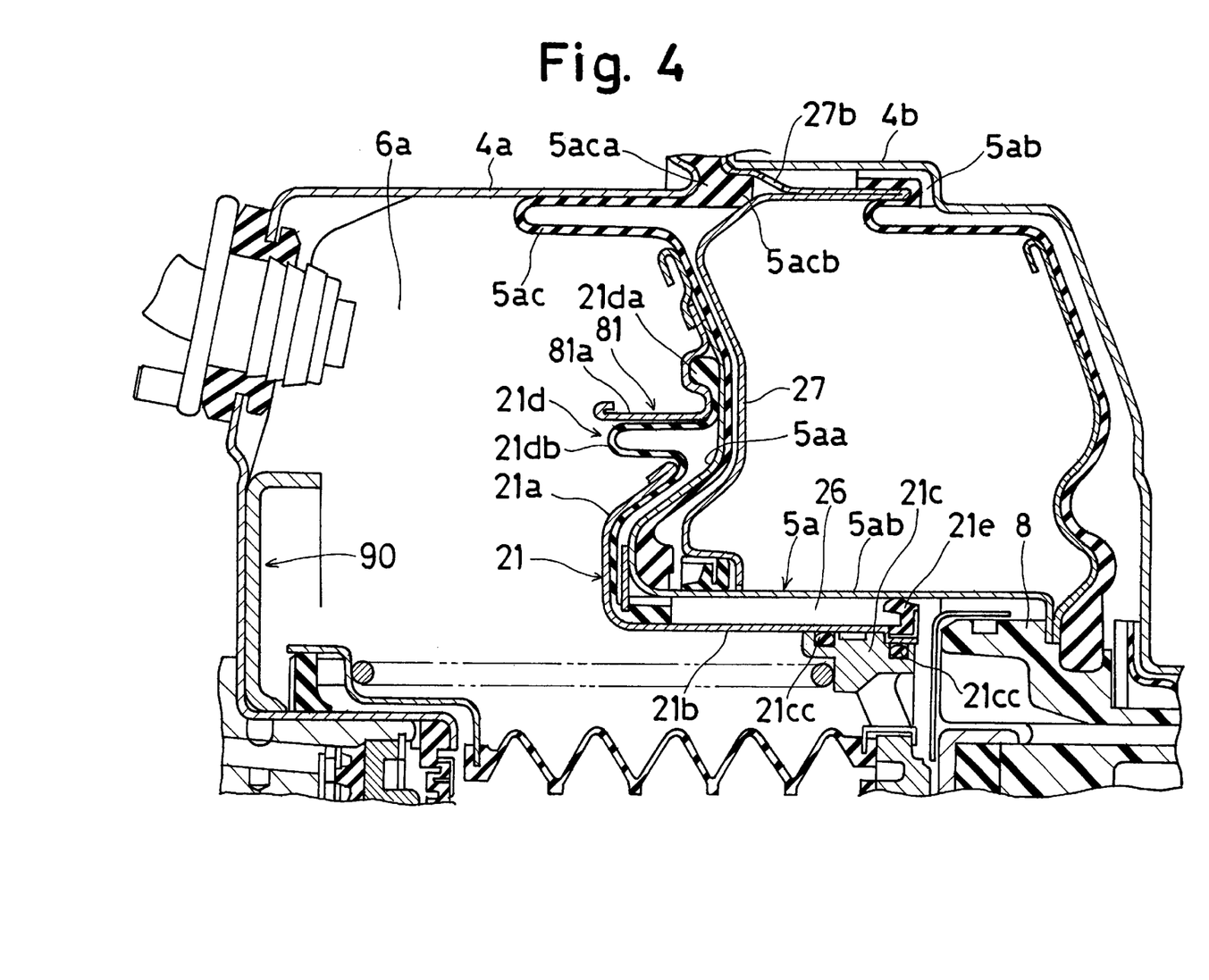
FIG. 4 is an enlarged cross-sectional view of the first moving wall part of the vacuum booster shown in FIG. 1.

As seen in FIG. 4, the first movable wall 5a has a substantially annular plate part 5aa (i.e., a first annular part), a cylindrical part 5ab (i.e., a first cylindrical part) connected at its front end to the inner periphery of the plate part 5aa and extending in the front-rear direction (i.e., the left-right direction in FIG. 4), and a substantially annular flexible diaphragm 5ac. The front face of the flexible diaphragm 5ac at the inner portion abuts upon the rear face of the plate part 5aa and extends outward from the inner periphery of the plate part 5aa. The first movable wall 5a is mounted in the housing 4 by an outer periphery part 5aca of the diaphragm 5ac which is clamped between the front shell 4a and the rear shell 4b. The rear end of the cylindrical part 5ab is connected to the outer periphery of the valve housing 8.

An auxiliary movable wall 21 is disposed in the first front chamber 6a on the front side of the first movable wall 5a (i.e., the left side in FIG. 4). The auxiliary movable wall 21 is movable in the front-rear direction in the first front chamber 6a. The auxiliary movable wall 21 has a substantially annular plate part 21a (i.e., a second annular part), a cylindrical part 21b (i.e., a second cylindrical part) which is connected at its front end to the inner periphery of the plate part 21a and which extends in the front-rear direction, a substantially annular flange part 21c (i.e., an abutting and engaging part) that engages a step 21bc (shown in FIG. 3) formed in the rear of the cylindrical part 21b, and a substantially annular flexible diaphragm 21d. The annular flange part 21c abuts the inner circumferential surface of the cylindrical part 21b in an airtight manner by way of the annular seal members 21cc, and is slidably fitted in an airtight manner at its inner periphery to the outer periphery of the shaft part 13a of the output rod 13 by way of an annular seal member 21ce (shown in FIG. 3). The front face of the substantially annular flexible diaphragm 21d at the inner portion abuts upon the rear face of the plate part 21a and extends outward from the inner periphery of the plate part 21a.

The auxiliary movable wall 21 is mounted in the first front chamber 6a by the outer periphery part 21da of the diaphragm 21d being caulked in an airtight manner to the outer periphery part of the plate part 5aa of the first movable wall 5a by way of a retainer 81. The valve housing 8 and the output rod 13 and the cylindrical part 5ab of the first movable wall 5a, and the cylindrical part 21b of the auxiliary movable wall 21 are disposed coaxially. The cylindrical part 21b of the auxiliary movable wall 21 is disposed inside the cylindrical part 5ab and the output rod 13 is disposed inside the cylindrical part 21b.

An annular seal member 21e is mounted on the outer periphery of the cylindrical part 21b of the auxiliary movable wall 21 as shown in FIG. 3. Thus, the cylindrical part 21b and hence the auxiliary movable wall 21 are slidable on the seal member 21e along the inner circumferential surface of the cylindrical part 5ab of the first moving wall 5a in an airtight manner.

As seen in FIG. 4, an auxiliary variable pressure chamber 26 is formed between the auxiliary movable wall 21 and the first movable wall 5a. The auxiliary variable pressure chamber 26 and the first front chamber 6a are bounded in an airtight manner by the plate part 21a, the cylindrical part 21b, the diaphragm and the seal member 21e of the auxiliary movable wall 21, and the plate part 5aa and the cylindrical part 5ab of the first movable wall 5a.

Between the inner periphery and the outer periphery of the diaphragm 21d, the diaphragm 21d possesses a bend part 21db that opens rearward. The retainer 81 has an annular projecting part 81a extending in the forward direction on the outer side of the bend part 21db.

The inner peripheral part of the flange part 21c of the auxiliary movable wall 21 has on its front face an annular seal member 21cd (shown in FIG. 3), and the flange part 21c is adapted to abut upon the opening rim 52c of the recess 52b of the first piston 52 in an airtight manner by way of the seal member 21cd. When the auxiliary movable wall 21 is not operating, a predetermined clearance exists between the flange part 21c and the opening rim 52c.

As mentioned above, the housing 4 has in the middle of the front inner face of the front shell 4a a cupshaped recessed part 40aa projecting toward the first front chamber 6a. Also, a substantially cup-shaped reinforcing plate 90 is disposed in the housing 4, abutting against the front inner face of the housing 4 around a cylindrical wall part 40ab of the recessed part 40aa.

A plate 61 facing the recessed part 40aa is disposed in the first front chamber 6a. A substantially annular seal member 62 is disposed between the outside of the front end of the cylindrical part 40ab of the recessed part 40aa and the inside of the front end of a cylindrical wall part 61a of the plate 61. A space 63 is also formed between the outside of the cylindrical part 40ab of the recessed part 40aa and the inside of the cylindrical wall part 61a of the plate 61, and also between the rear face of a base part 40ac of the recessed part 40aa and the front face of a base part 61b of the plate 61. This space 63 is separated from the first front chamber 6a in an airtight manner.

The front end of the cylindrical wall part 61a of the plate 61 and the rear face of a base part 90c of the reinforcing plate 90 are a predetermined distance apart and so are not in abutment with each other. An annular plate is mounted on the front face of the seal member 62, and by way of this annular plate an inner peripheral portion of the seal member 62 abuts upon the rear end of an inner cylindrical wall part 90a of the reinforcing plate 90.

An air passage 28 connecting the auxiliary variable pressure chamber 26 with the space 63 is mounted between the flange part 21c of the auxiliary movable wall 21 and the base part 61b of the plate 61 so that a rear portion of the air passage is positioned inside the cylindrical part 21b of the auxiliary movable wall 21. The air passage 28 thus covers the extension part 52a of the first piston 52 and the shaft part 13a of the output rod 13. The air passage 28 is made of an elastic material shaped like a bellows, extends in the front-rear direction (i.e., the left-right direction of FIG. 3) and is able to expand and contract in the front-rear direction.

An annular groove 28aa is formed in the outer periphery of the air passage 28 at the front end part 28a of the air passage 28. The annular groove 28aa receives the rim 61da of the opening 61ca formed in the base part 61b of the plate 61 in an airtight manner. The rear end part 28b of the air passage 28 is connected by a retainer to an inner periphery part of the flange part 21c of the auxiliary moving wall 21 in an airtight manner.

The plate 61 has an outer flange part 61c at the front end of the cylindrical wall part 61a, and a return spring 31 is fitted between the outer flange part 61c and into a step in an outer periphery portion of the flange part 21c of the auxiliary movable wall 21. The front end of the spring 31 abuts upon the outer flange part 61c of the plate 61 and urges the plate 61 forward and thereby causes the plate 61 to abut by way of the seal member 62 against the rear end of the inner cylindrical wall part 90a of the reinforcing plate 90 and hence the front shell 4a.

The other end of the return spring 31 abuts upon the outer periphery of the front face of the flange part 21c of the auxiliary movable wall 21 and urges the flange part 21c rearward. The rearward movement of the flange part 21c causes the inner periphery of the plate part 21a of the auxiliary movable wall 21 to abut against the inner periphery of the plate part 5aa of the first movable wall 5a by way of the inner periphery of the diaphragm 21d and consequently urges the power piston 9 rearward.

A connecting hole 21ba is formed in the cylindrical wall part 21b of the auxiliary moving wall 21 for connecting the auxiliary variable pressure chamber 26 with the inside of the air passage 28. A connecting passage 21ca (i.e., a second connecting passage) extending in the radial direction of the flange part 21c (i.e., the vertical direction in FIG. 3) is formed in the flange part 21c. The connecting passage 21ca has one end opening at the front face of the inner periphery of the flange part 21c, and the other end opening at the side face of the outer periphery of the flange part 21c and facing the connecting hole 21ba. In this manner, the connecting passage 21ca connects the auxiliary variable pressure chamber 26 to the inside of the air passage 28 by way of the connecting hole 21ba. Accordingly, the auxiliary variable pressure chamber 26 and the inside of the air passage 28 are connected by way of the connecting hole 21ba and the connecting passage 21ca.

As shown in FIG. 3, a fitting hole 62a extending in the front-rear direction (i.e., the left-right direction of FIG. 3) is formed in the seal member 62. One end of a tube 66 is fitted in this fitting hole 62a. As seen with reference to FIG. 5, the tube 66 passes through a connecting hole 90ba formed in a cross-axial direction (i.e., the vertical direction in FIG. 5) in the outer cylindrical wall part 90b of the reinforcing plate 90 and extends in this cross-axial direction. One end of the tube 66 is connected to a variable pressure port 29c of the electromagnetic valve unit 29, which is integrally mounted in an airtight manner on the front of the front shell 4a. The first end of the tube 66 passes through a space between the seal member 62 and the base part 90c of the reinforcing plate 90 and is inserted into the fitting hole 62a of the seal member 62 from the front. The tube 66 is connected or in communication with the space 63. Thus, the electromagnetic valve unit 29 and the inside of the air passage 28 are connected by way of the tube 66, the space 63 and the cylindrical wall part 61a.

As seen in FIG. 3, a connecting opening 21cb, which constitutes a first connecting opening, is formed in the outer part of the flange part 21c of the auxiliary moving wall 21, that is outside of where flange part 21c abuts against the air passage 28. The connecting opening 21cb extends in the front-rear direction and connects the first front chamber 6a with the vacuum passage 8c of the valve housing. A connecting hole 27a connecting the first front chamber 6a with the second front chamber 6b by way of the connecting opening 21cb is formed in the partition wall 27. As shown in FIG. 1, first front chamber 6a is connected by way of an inlet 4c to a vehicle engine inlet manifold, which serves as a vacuum source, and is thus always under a negative pressure. Therefore, the second front chamber 6b is also constantly maintained under a negative pressure.

The first rear chamber 7a is connected with the second rear chamber 7b by a groove 5acb (shown in FIG. 4) formed in the inner circumferential face of the outer periphery part 5aca of the diaphragm 5ac of the first movable wall 5a, by a hole 27b is formed in the partition wall 27 and by a groove 5ab formed in the outer circumferential face of a bead part at the outer edge of the second moving wall 5b.

Figure 5:
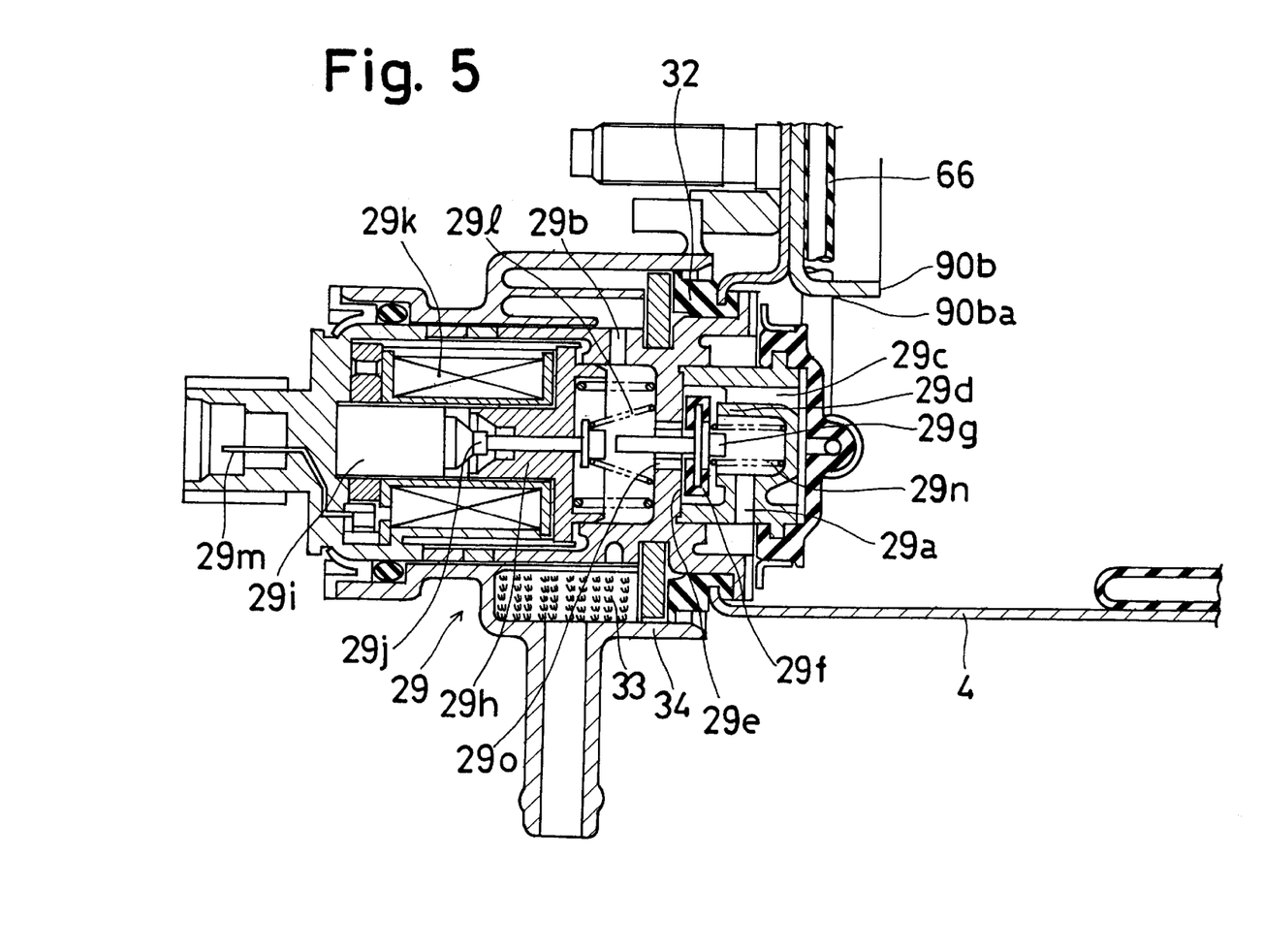
FIG. 5 is an enlarged cross-sectional view of the electromagnetic valve unit used in the vacuum booster shown in FIG. 1.

FIG. 5 shows the electromagnetic valve unit 29 that constitutes a switching means for selectively connecting the auxiliary variable pressure chamber 26 of the vacuum booster 2 with the vacuum source or with the atmosphere. An electromagnetic valve 29 is mounted in an airtight manner on the front face of the housing 4 by way of a seal member 32. The electromagnetic valve unit 29 has inside it a fixed pressure port 29a connecting with the first front chamber 6a, an atmospheric air port 29b connecting with an air cleaner having a cleaner member 33 for atmospheric air introduction 34, a variable pressure port 29c connected to the air passage 28, a fixed pressure valve seat 29d for connecting and disconnecting the first front chamber 6a and the auxiliary variable pressure chamber 26, an atmospheric air valve seat 29e for connecting and disconnecting the auxiliary variable pressure chamber 26 to and from the atmosphere, a valve part 29g having a valve 29f at one end forming a valve member, a fixed core 29h, a movable core 29i, a rod part 29j passing through the fixed core 29h and adapted to abut on its front side upon the movable core 29i, and a solenoid 29k disposed around the fixed core 29h and the movable core 29i.

The electromagnetic valve unit 29 has at its periphery an air cleaner for atmospheric air introduction 34, which forms an atmospheric air inflow passage extending around the periphery of the electromagnetic valve unit 29 to introduce atmospheric air into the air passage 28 through the electromagnetic valve unit 29. The air cleaner for atmospheric air introduction 34 is connected by a tube (not shown) to a space (not shown) inside the vehicle.

A spring 29l is disposed between the rod part 29j and a dividing wall of the fixed core 29h. The spring 29l urges the rod part 29j away from the valve part 29g (i.e., to the left in FIG. 5) and thereby urges the movable core 29i away from the fixed core 29h.

The solenoid 29k is connected by a terminal 29m to a power supply (not shown) of the vehicle, and is supplied with power from this power supply by a controller (not shown) of the vehicle for operational purposes.

The valve part 29g is urged toward the left in FIG. 5 by a spring 29n, and the valve 29f is thereby moved away from the fixed pressure valve seat 29d so that it abuts upon the atmospheric air valve seat 29e. In the non-operating state of the electromagnetic valve unit 29 shown in FIG. 5, the rod part 29j and the valve part 29g are not in abutment.

In this state, because the valve 29f is not seated on the fixed pressure valve seat 29d, the auxiliary variable pressure chamber 26 is connected with the first front chamber 6a and hence with the vacuum source by way of the air passage 23, the variable pressure port 29c, the gap between the valve 29f and the fixed pressure valve seat 29d, and the fixed pressure port 29a.

On the other hand, when power is supplied to the solenoid 29k from the power supply by a controller of the vehicle (not shown), the solenoid 29k operates to attract the movable core 29i to the fixed core 29h, and the movable core 29i slides toward the fixed core 29h (i.e., to the right in FIG. 5). Consequently, the movable core 29i pushes the rod part 29j, and the movable core 29i and the rod part 29j move integrally to the right (as viewed with reference to FIG. 5.)

As a consequence of the movement of rod part 29j to the rear (i.e., to the right in FIG. 5), the rear end of the rod part 29j abuts upon the front end of the valve part 29g and the rod part 29j pushes the valve part 29g toward the rear (i.e., to the right in FIG. 5). Consequently, the valve 29f abuts on the fixed pressure valve seat 29d and the valve 29f is unseated from the atmospheric air valve seat 29e.

Thus, atmospheric air is introduced into the auxiliary variable pressure chamber 26 from a space inside the vehicle (not shown) by way of the connecting hole 21ba, the connecting passage 21ca, the opening 61ca, the space 63, the tube 66, the inside of the air passage 28, the variable pressure port 29c, the gap between the valve 29f and the atmospheric air valve seat 29e, a connecting hole 29o, the atmospheric air port 29b, and the air cleaner for atmospheric air introduction 34.

Positioned within the actuator part 53 shown in FIG. 1 is hydraulic piping carrying brake fluid, electromagnetic valves for cutting off the flow of brake fluid in the hydraulic piping, reservoirs for storing brake fluid, a pump unit for pumping brake fluid, and an electronic control unit (ECU) for controlling the electromagnetic valves and the pump unit.

The operation of the hydraulic pressure generator 1 according to the present invention is as follows. In an initial state, in which a vehicle driver is not operating the brake pedal 80 constituting a brake operating member of the vehicle, the air valve part 16aa of the seal part 16a of the control valve 16 is seated on the air valve seat 11a of the input member 11 and the vacuum valve part 16ab of the seal part 16a is not seated on the vacuum valve seat 8a of the valve housing 8. Consequently, the second rear chamber 7b is connected with the vehicle engine intake manifold (not shown) constituting the vacuum source by way of the air passage 8d, the gap between the vacuum valve part 16ab and the vacuum valve seat 8a, the vacuum passage 8c, the space between the front part of the valve housing 8 and the rear face of the flange part 21c of the auxiliary movable wall 21, the connecting opening 21cb of the flange part 21c, the plate 61, and the inlet 4c.

When the brake pedal 80 is operated by a vehicle driver, the input rod 10 connected to the brake pedal receives the input and moves forward. The input member 11 fixed to the input rod 10 also moves forward integrally with the input rod 10.

As a result of the movement of the input member 11, the control valve 16 and hence the seal part 16a also move forward integrally with the input member 11 under the urging force of the valve spring 18, and soon the vacuum valve part 16ab of the seal part 16a abuts upon the vacuum valve seat 8a of the valve housing 8. The second rear chamber 7b is thereby cut off from the first front chamber 6a and consequently also disconnected from the vacuum source of the vehicle.

When the input member 11 moves further forward, the air valve part 16aa of the seal part 16a is unseated from the air valve seat 11a of the input member 11, and the second rear chamber 7b is connected with the atmosphere by way of the air passage 8d and the gap between the air valve part 16aa and the air valve seat 11a. Accordingly, because an air pressure differential arises between the first front chamber 6a and the first rear chamber 7a, and between the second front chamber 6b and the second rear chamber 7b due to the inflow of atmospheric air into the second rear chamber 7b and consequently the inflow of air into the first rear chamber 7a, the two movable walls 5a and 5b are subjected to a load resulting from this air pressure differential and the power piston 9 pushes the output rod 13 forward by way of the reaction disc 12.

As a result of the movable walls 5a and 5b being moved forward, the auxiliary movable wall 21 abutting against the inner periphery of the plate part 5aa of the first movable wall 5a also moves forward. Thus, the power piston 9 and the auxiliary movable wall 21 advance integrally, and the power piston 9 outputs an amplified input to the output rod 13.

When the thrust force of the power piston 9 is outputted to the output rod 13 and the output rod 13 is moved forward, a first output is applied to the first piston 52 of the master cylinder 3 by the output rod 13, which advances the first piston 52. As a result of the advancement of the first piston 52, the brake fluid inside the first pressure chamber 58 increases in pressure.

As a result of the rise in brake fluid pressure inside the first pressure chamber 58, the second piston is advanced, whereupon the brake fluid inside the second pressure chamber increases in pressure. As a result of the increase in pressure of the brake fluid inside the two chambers, brake fluid flows out through the actuator part 53 and into the wheel cylinders 54–57 from an outlet port 3c connected to the first pressure chamber 58 and an outlet port 3d connected to the second pressure chamber. A braking force is thus applied to the wheels FL, FR, RL, RR of the vehicle.

Thereafter, under a reaction force that the input rod 10 receives from the reaction disc 12 by way of the input member 11, the air valve part 16aa of the seal part 16a and the air valve seat 11a of the input member 11, or the vacuum valve part 16ab of the seal part 16a and the vacuum valve seat 8a of the valve housing 8, are selectively engaged. The assisting force of the vacuum booster 2 is thus controlled according to the input from the driver applied to the input rod 10 . A reaction to the thrust force of the power piston 9 and the input generated by the brake pedal 80 being operated and transmitted to the input member 11 are applied to the reaction disc 12 and balance.

When, as a result of atmospheric air flowing into the two rear chambers 7a, 7b, the interior of each of the rear chambers 7a, 7b reaches atmospheric pressure, the power piston 9 advances no further. The output of the vacuum booster 2 from then on is effected by the input rod 10 and the input member 11 pushing the output rod 13 forward by way of the reaction disc 12. That is, the input and the output are equal.

When the input member 11 pushes the output rod 13 like this, because a predetermined clearance is provided between the bottom of the cuplike part 13b of the output rod 13 and the rear face of the inner periphery of the flange part 21c of the auxiliary movable wall 21 facing this bottom part, when the output rod 13 is moved forward, the flange part 21c of the auxiliary moving wall 21 does not abut against the bottom of the cuplike part 13b of the output rod 13 and move the auxiliary moving wall 21 forward with it.

Figure 6:
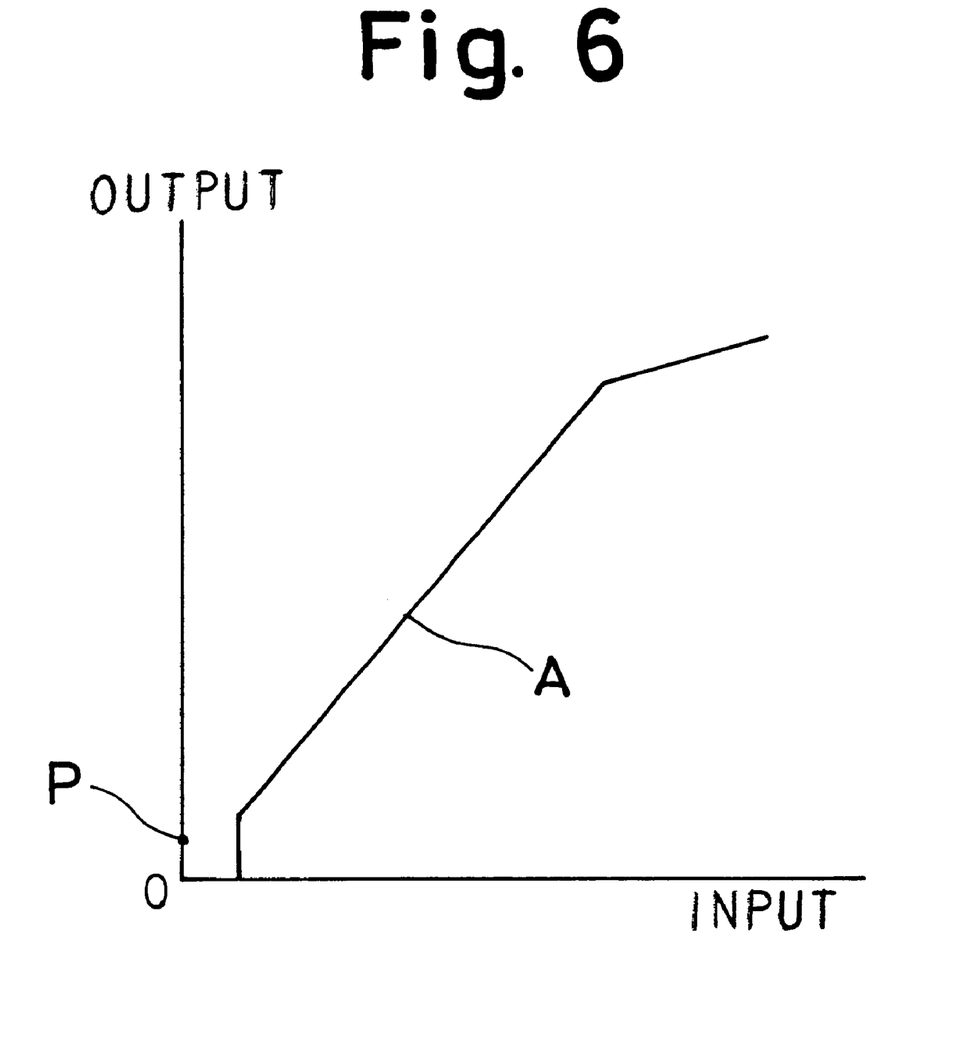
FIG. 6 is a graph illustrating the input and output characteristics of the hydraulic pressure generator shown in FIG. 1.

In this normal operating state, because the solenoid 29k is not operating, the auxiliary variable pressure chamber 26 and the first front chamber 6a are connected, there is no pressure difference across the auxiliary moving wall 21, and the auxiliary moving wall 21 is in a non-operating state. The relationship between the brake operation force acting on the input rod 10 and the brake output acting on the output rod 13 and hence the master cylinder 3 at this time is shown in FIG. 6 by the line A.

Now, for example, when during left turning of the vehicle, the ECU of the actuator part 53 detects that the vehicle is oversteering, a known operation of brake control for steering (oversteer suppression control) is initiated. Here, without a braking operation of the driver, brake fluid pressure is applied to the front wheel on the outer side of the turn, in this instance the front right wheel FR, from the pump unit of the actuator part 53.

While the operation of brake control for steering is started in the actuator part 53, power is supplied from the power supply to the solenoid 29*k*, and the solenoid 29*k* receiving this supply of power exerts an electromagnetic force and moves the moving core 29*i* rearward against the urging force of the springs 29*l*, 29*n*.

Because atmospheric air is introduced into the auxiliary variable pressure chamber 26 as a result of movement of the moving core 29*i*, an air pressure differential arises across the auxiliary movable wall 21, and the diaphragm 21*d* along with the auxiliary movable wall 21 are moved forward with the bend part 21*db* of the diaphragm 21*d* unfurling progressively from its outer periphery onto the inner surface of the cylindrical wall part 81*a* of the retainer 81.

As a result of the auxiliary movable wall 21 being moved, the front face of the inner periphery of the flange part 21*c* of the auxiliary movable wall 21 abuts by way of the seal member 21*cd* upon the opening rim 52*c* of the first piston 52, and the first piston 52 is moved forward by the advancing movement of the auxiliary movable wall 21. Also, the auxiliary movable wall 21 compresses the air passage 28 as it advances.

When the first piston 52 is thus subjected to a load resulting from a pressure differential between the first front chamber 6*a* and the auxiliary variable pressure chamber 26 I.e., a second output from the auxiliary movable wall 21), and is moved forward, brake fluid pressurized as a result of the movement of the auxiliary movable wall 21 is applied from the master cylinder 3 toward the pump unit of the actuator part 53.

The pump unit of the actuator part 53 takes in this brake 24 fluid pressurized as a result of movement of the auxiliary movable wall 21 and delivers brake fluid toward the wheel cylinder 55 of the right side front wheel FR, as in this example the front right wheel FR is the wheel affected by the operation of the brake control for steering function. Consequently, a braking force is applied to the right side front wheel FR.

The relationship at this time between the input acting on the input rod 10 in the vacuum booster 2 and the output acting on the first piston 52 is shown by the point P in FIG. 6. That is, the vacuum booster 2 and hence the hydraulic pressure generator 1 output an output P for an input of 0.

The amount of movement of the auxiliary movable wall 21 preferably is determined from the amount of brake fluid necessary for pressurized supply to the brake lines from the pump unit of the actuator part 53 for performing the brake control for steering function. Also, in a construction wherein brake control for steering has been added to a brake system having an ABS function and during brake control for steering, a pump unit takes in brake fluid from a master cylinder and delivers brake fluid toward a wheel being controlled, it is determined according to the pressure required as a pre-pressurizing function of this pump unit. For example, the movement of the auxiliary movable wall 21 maybe 5 mm to 15 mm and the pressurization pressure of brake fluid resulting from the output P may be 3 kg/cm$^2$ to 10 kg/cm$^2$. In accordance with the present invention, these necessary pressures can be supplied by suitably setting the size of the diameter of the auxiliary moving wall 21, and the output at point P in FIG. 6 is an output value appropriate for the pre-pressurizing function with respect to the pump operation of brake control for steering, Thus, upon the starting of the operation or function of brake control for steering, as a result of the brake fluid pressurized by the operation of the auxiliary movable wall 21 to push the first piston 52 being taken into the pump unit of the actuator part 53 from the master cylinder 3, the intake and delivery operation of the pump unit can be made smoother and hence it is possible for the brake fluid pressure of the front wheel on the outer side of the turn to be increased smoothly. Also, because the fluid pressure applied to the non-controlled wheels FL, RL, RR is relatively slight, those other wheels do not constitute any hindrance whatsoever to brake control for steering.

During the operation of brake control for steering, the operation of the auxiliary movable wall 21 to push the first piston 52 constitutes a pre-pressurizing function in brake control for steering.

When a microcomputer of the actuator part 53 detects that the operation of brake control for steering has ended, the supply of power from the power supply to the solenoid 29*k* is stopped and the solenoid 29*k* ceases to exert an electromagnetic force on the movable core 29*i*. The movable core 29*i* is thus returned forward by the urging force of the spring 29*l* by way of the rod part 29*j* Also, the valve part 29*g* is urged forward by the urging force of the spring 29*n*, and the valve 29*f* moves away from the fixed pressure valve seat 29*d* and abuts against the atmospheric air valve seat 29*e*.

As a result of the forward movement of the movable core 29*i* and the valve part 29*g*, the auxiliary variable pressure chamber 26 is cut off from the atmosphere and reconnected with the first front chamber 6*a* and the auxiliary movable wall 21. By way of the auxiliary movable wall 21, the power piston 9 is pushed back rearward by the return spring 31. That is, the pre-pressurizing operation of the hydraulic pressure generator 1 ends.

The operation of brake control for steering during brake pedal operation by the vehicle driver in accordance with the present invention will be discussed. When the brake pedal 80 is operated by the driver, the input rod 10 connected to the brake pedal 80 receives the operation force as an input and moves forward. Consequently, the input member 11 fixed to the input rod 10 also moves forward integrally with the input rod 10.

As a result of the movement of the input member 11, the control valve 16 and hence the seal part 16*a* also move forward together with the input member 11 under the urging force of the valve spring 18. Soon, the vacuum valve part 16*ab* of the seal part 16*a* abuts upon the vacuum valve seat 8*a* of the valve housing 8 and the second rear chamber 7*b* is cut off from the first front chamber 6*a* and thereby also cut off from the vehicle vacuum source.

When the input member 11 moves further forward, the air valve part 16*aa* of the seal part 16*a* unseats from the air valve seat 11*a* of the input member 11 and the second rear chamber 7*b* is connected with the atmosphere. Consequently, atmospheric air flows into the second rear chamber 7*b* and hence into the first rear chamber 7*a*. An air pressure differential thus arises between the front chambers 6*a*, 6*b* and the rear chambers 7*a*, 7*b*, and the movable walls 5*a*, 5*b* are subjected to a load resulting from this air pressure differential. Consequently, the power piston 9 pushes the output rod 13 forward by way of the reaction disc 12.

Because brake control for steering is in progress in this example, the bottom of the recess 52*b* of the first piston 52 has already moved forward by a predetermined amount with respect to the front end of the shaft part 13*a* of the output rod 13. Therefore, in the initial stage of movement of the power piston 9 and the output rod 13, the front end of the shaft part 13*a* of the output rod 13 does not abut upon the bottom of the recess 52*b* of the first piston 52, but rather it abuts upon the bottom of the recess 52*b* of the first piston 52 only after the power piston 9 and the output rod 13 have advanced by a predetermined amount with respect to the housing 4. After the first piston 52 and the output rod 13 come into abutment, the braking operation of the vacuum booster 2 described above is resumed.

In the hydraulic pressure generator 1 of this preferred embodiment, a vacuum booster 2 having a brake pedal 80 and an output rod 13 is used for applying a first output to the piston 52. A pressure difference between the front chambers 6*a*, 6*b* and the rear chambers 7*a*, 7*b* is used to boost the input applied by the brake pedal 80. A differential pressure mechanism disposed inside the vacuum booster 2, which utilizes a pressure differential between the second front chamber 6*b* and the auxiliary variable pressure chamber 26, is used to apply a second output to the piston 52. Through having the auxiliary movable wall 21, a first front chamber 6*a*, an auxiliary variable pressure chamber 26 and an electromagnetic valve unit 29, a construction is realized wherein a normal braking output is generated in the output rod 13 and an output for pre-pressurization is generated in the auxiliary movable wall 21. That is, by the piston 52 being made to operate by the auxiliary movable wall 21 being moved, a pre-pressurizing function for pump operation of brake control for steering can be carried out.

As described above because the auxiliary variable pressure chamber 26 is bounded by the auxiliary moving wall 21 and the first moving wall 5*a*, the auxiliary variable pressure chamber 26 can be formed with a relatively simple and efficient construction in comparison with prior devices.

Also, as a result of the auxiliary variable pressure chamber 26 being bounded by the plate part 21*a*, the cylindrical wall part 21*b*, the diaphragm 21*d* and the seal member 21*e* of the auxiliary moving wall 21, and the plate part 5*aa* and the cylindrical wall part 5*ab* of the first moving wall 5*a*, the diaphragm 21*d* and the seal member 21*e*, which is necessary for the airtight connection/abutment between the auxiliary moving wall 21 and the first moving wall 5*a*, can be made small. Additionally, as a result of the auxiliary movable wall 21 sliding on the cylindrical part 5*ab* of the first movable wall 5*a* by way of the cylindrical part 21*b*, stable forward and rearward movement of the auxiliary movable wall 21 is made possible.

Also, because the flange part 21*c* of the auxiliary movable wall 21 slides on the outside of the shaft part 13*a* of the output rod 13, stable forward and rearward movement of the auxiliary movable wall 21 is made possible. Because the auxiliary movable wall 21 has the connecting opening 21*cb* in the flange part 21*c*, the connection between the first front chamber 6*a* and the vacuum passage 8*c* connected with the vacuum valve V can be made by way of this connecting opening 21*cb*, and also the connection between the first front chamber 6*a* and the second front chamber 6*b* can be made by way of the connecting opening 21*cb*.

By virtue of the air passage 28 being shortened in the front-rear direction as the auxiliary movable wall 21 advances, the movement of the auxiliary movable wall 21 can be made smoother.

It is significant to note that in the present invention, because the auxiliary movable wall 21 has the connecting passage 21*ca* in the flange part 21*c*, a connection between the air passage 28 and the auxiliary variable pressure chamber 26 is possible. Also, because the auxiliary moving wall 21 has the flange part 21*c*, it can engage with the piston 52 and the piston 52 can be made to move along with the movement of the auxiliary movable wall 21.

Also, by virtue of the coaxial disposition of the valve housing 8, the output rod 13, the cylindrical part 5*ab* of the first movable wall 5*a*, the cylindrical part 21*b* of the auxiliary movable wall 21 and the air passage 28, the urging force accompanying the compression of the air passage 28 occurring as a result of movement of the power piston 9 and the auxiliary movable wall 21 can be stably applied relative to the axial centers of the members, thus further promoting smooth movement of the power piston 9 and the auxiliary movable wall 21.

Thus with a relatively simple construction, as compared to other pressure generators, it is possible to provide a more efficient hydraulic pressure generator 1 with improved efficiency of assembly and reduced cost.

The vacuum booster according to the present invention is applied in a brake fluid pressure circuit having brake control for steering, but of course the invention is not limited particularly to this construction. The present invention can be applied in any brake fluid pressure circuit needing a pre-pressurization function. For example, when the invention is practiced in a brake fluid pressure apparatus for a vehicle having a traction control system which, upon starting the vehicle an excessive driving force acts on the vehicle wheels and the driving wheels slip on the road surface, applies a braking force to the slipping driving wheels by driving a pump device (without the driver performing any braking operation) to thereby cause the slipping wheels to grip the road surface by temporarily increasing the brake fluid pressure so that the rotation of the wheels will slow to allow the wheels to effectively grip the road surface so that the vehicle can be accelerated effectively. This invention makes it possible for brake fluid to be supplied to apply a braking force to the slipping driving wheels more smoothly.

As described above, the operation of the auxiliary movable wall 21 accompanying operation of the electromagnetic valve unit 29 is used as a pre-pressurizing function in brake control for steering, but the present invention is not limited to this construction. For example, this embodiment of the invention can also be used as an automatic braking function for making the hydraulic pressure generator 1 exert an output greater than a normal output, by power being supplied from the power supply to the solenoid 29*k* independently of any braking operation of the driver, when the inter-vehicle distance between the vehicle and a vehicle in front has become shorter than a predetermined distance and a controller of the vehicle (not shown) has determined a necessity for automatic braking. This determination can be made by a method such as determining that automatic braking is necessary on the basis of a value detected by an inter-vehicle distance sensor (not shown) mounted on the front of the vehicle. When a construction according to the present invention is used for this automatic braking function, it may be preferable for the construction of the auxiliary variable pressure chamber 26 to be made somewhat large and for the stroke of the auxiliary movable wall 21 and the output pressure of the master cylinder 3 to be increased.

The electromagnetic valve unit 29 is described above as being connected with the vacuum source by way of the first front chamber 6*a*, but the invention is not limited in this context. Similar effects can also be obtained for example in a hydraulic pressure generator according to the invention wherein the electromagnetic valve unit is directly connected with the vacuum source.

In the embodiment of the present invention described above, the vacuum booster 2 has a tandem type construction, but the present invention has application to other types of vacuum boosters such as a vacuum booster of the single type construction.

Although the auxiliary movable wall 21 is described as being engaged with the first piston 52 of the master cylinder 3, the invention is also applicable to a vacuum booster wherein the auxiliary movable wall 21 engages the output rod 13 and the first piston is moved by the output rod 13 being pushed by the movement of the auxiliary movable wall 21 accompanying atmospheric air entering the auxiliary variable pressure chamber 26.

As an alternative to the hydraulic pressure generator 1 serving as the pressure generator, a pressure generator for generating an air pressure can also be employed.

According to the present invention, an auxiliary variable pressure chamber is bounded by an auxiliary movable wall and a movable wall. It is thus possible for the auxiliary variable pressure chamber to be formed using a more simple construction, resulting in a pressure chamber which is relatively more efficient, and which may be assembled more efficiently and at lower cost. In the present invention, the movable wall has a first cylindrical wall part extending in the front-rear direction and so the auxiliary moving wall can be guided by the this first cylindrical wall part as it advances and retracts.

By providing the auxiliary movable wall with a second cylindrical wall part disposed coaxially with the first cylindrical wall part and located in the first cylindrical par, a superior form of the auxiliary movable wall is achieved. According to the present invention, the movable wall possesses the first annular part, and the first cylindrical wall part is disposed at the inner periphery of the first annular part of the movable wall and is connected by a rear portion thereof to the valve housing. Also, the auxiliary movable wall has a second annular part disposed in facing relation to the first annular part of the movable wall and the second cylindrical wall part is disposed at the inner periphery of the second annular part. Further, the auxiliary variable pressure chamber is formed by the first annular part, the second annular part, the first cylindrical wall part and the second cylindrical wall part.

The outer periphery of the second annular part of the auxiliary movable wall is connected in an airtight manner to the first annular part of the movable wall, and the second cylindrical wall part of the auxiliary movable wall slides in an airtight manner along the inner periphery of the first cylindrical wall part of the movable wall. This thus provides superior connection or abutment between the auxiliary movable wall and the movable wall. The outer periphery of the annular part of the auxiliary movable wall is connected to the annular part of the movable wall by a flexible member, thus providing a superior connection between the outer periphery of the auxiliary movable wall and the movable wall.

Also, the second cylindrical wall part abuts upon the inner periphery of the first cylindrical wall part by way of a seal member, thus providing a highly effective abutment between the second cylindrical part of the auxiliary movable wall and the first cylindrical part of the movable wall.

As described above, the piston extends into the housing and the auxiliary movable wall has an engaging part which is adapted to engage the piston. Because the auxiliary movable wall engages the piston in this manner, the piston is made to move along with the movement of the auxiliary movable wall. This provides a highly effective engagement between the piston and the auxiliary movable wall.

According to the present invention, a superior form of connection is provided between the front chamber and the vacuum valve. That is because the valve housing has a vacuum passage connecting the front chamber with the vacuum valve, the first cylindrical wall part of the movable wall and the second cylindrical wall part of the auxiliary movable wall are disposed coaxially with the valve housing, the output member is disposed inside the second cylindrical wall part and in front of the valve housing, the auxiliary movable wall has on the second cylindrical wall part an abutting part for abutting upon the output member, and the abutting part has a first connecting passage connecting the vacuum passage with the front chamber.

A superior form of connection is also provided between the switching means and the auxiliary variable pressure. This is by virtue of the first cylindrical wall part of the movable wall and the second cylindrical wall part of the auxiliary movable wall being disposed coaxially with the valve housing, the output member being disposed inside the second cylindrical wall part and in front of the valve housing, the auxiliary movable wall having on the second cylindrical wall part an abutting part for abutting upon the output member, the switching means having an atmospheric air passage connecting with the auxiliary variable pressure chamber, the abutting part having a second connecting passage connecting the atmospheric air passage with the auxiliary variable pressure chamber, and the atmospheric air passage having one opening connected with the switching means and the another opening connected with the second connecting passage of the abutting part. Also, because the output member is disposed inside the atmospheric air passage, an effective disposition of the output member is achieved. The present invention also provides a construction in which the auxiliary variable pressure chamber is bounded by the auxiliary moving wall and the first moving wall, thus allowing the auxiliary variable pressure chamber to be formed using a more simple construction.

The principles, a preferred embodiment and modes of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A pressure generator comprising:
   a housing in which is formed at least one pressure chamber;
   a power piston having a moving wall disposed inside the pressure chamber for advancing and retreating movement with respect to the housing and dividing the pressure chamber into a front chamber connected to a vacuum source and a rear chamber selectively connected to the vacuum source or the atmosphere, and a valve housing attached to the moving wall;
   an input member disposed inside the valve housing for advancing and retreating movement with respect to the valve housing and movable by brake operation;

a valve mechanism disposed inside the valve housing and having a vacuum valve for connecting the rear chamber with the front chamber in correspondence with movement of the input member and an atmospheric air valve for connecting the rear chamber with the atmosphere in correspondence with movement of the input member;

an output member for outputting from the pressure generator a thrust force corresponding to movement of the moving wall;

an auxiliary moving wall disposed for advancing and retreating movement inside the front chamber, the auxiliary moving wall including a part provided with a connecting passage;

an auxiliary variable pressure chamber bounded inside the front chamber by the auxiliary moving wall and the moving wall;

an air passage arranged coaxially with the valve housing, and connected to the auxiliary variable pressure chamber by way of the connecting passage, the output member being positioned in the air passage;

switching means for selectively connecting the auxiliary variable pressure chamber with the vacuum source or the atmosphere;

a cylinder body having a cylinder bore and mounted in a front part of the housing; and a piston positioned in the cylinder bore and forming in front of the piston a pressure chamber, said piston engageable with an output member and movable inside the cylinder bore along with movement of the auxiliary moving wall.

2. A pressure generator according to claim 1, wherein the moving wall has a first cylindrical wall part extending in the front-rear direction.

3. A pressure generator according to claim 2, wherein the auxiliary moving wall has a second cylindrical wall part disposed coaxially with the first cylindrical wall part and inserted into the first cylindrical wall part.

4. A pressure generator according to claim 3, wherein the moving wall has a first annular part and the first cylindrical wall part is disposed at an inner periphery of the first annular part of the moving wall and is connected by a rear portion thereof to the valve housings and the auxiliary moving wall has a second annular part disposed facing the first annular part of the moving wall and the second cylindrical wall part is disposed at an inner periphery of the second annular part and the auxiliary variable pressure chamber is formed between the first annular part and the second annular part and between the first cylindrical wall part and the second cylindrical wall part.

5. A pressure generator according to claim 4, wherein an outer periphery of the second annular part of the auxiliary moving wall is airtightly connected to the first annular part of the moving wall and the second cylindrical wall part of the auxiliary moving wall abuts airtightly and slidably upon an inner periphery of the first cylindrical part of the moving wall.

6. A pressure generator according to claim 5, wherein the outer periphery of the second annular part is connected to the first annular part by a flexible member.

7. A pressure generator according to claim 5 or claim 6, wherein the second cylindrical wall part abuts upon the inner periphery of the first cylindrical wall part by way of a seal member.

8. A pressure generator according to claim 4, wherein the valve housing has a vacuum passage connecting the front chamber with the vacuum valve, and the first cylindrical wall part of the moving wall and the second cylindrical wall part of the auxiliary moving wall are disposed coaxially with the valve housing, and the output member is disposed inside the second cylindrical wall part and in front of the valve housing, and the auxiliary moving wall has on its second cylindrical wall part an abutting part for abutting upon the output member and the abutting part has another connecting passage connecting the vacuum passage with the front chamber.

9. A pressure generator according to claim 4, wherein the first cylindrical wall part of the moving wall and the second cylindrical wall part of the auxiliary moving wall are disposed coaxially with the valve housing and the output member is disposed inside the second cylindrical wall part and in front of the valve housing, and the auxiliary moving wall has on the second cylindrical wall part the abutting part for abutting upon the output member, and the switching means is provided with the air passage, the air passage having one opening thereof connected with the switching means and another opening thereof connected with the connecting passage of the abutting part.

10. A pressure generator according to claim 1, wherein the piston extends into the housing and the auxiliary moving wall has an engaging part which is engageable with the piston.

11. A pressure generator comprising:

a housing in which is formed at least one pressure chamber;

a partition wall member disposed in the pressure chamber and dividing the pressure chamber into a front side pressure chamber and a rear side pressure chamber;

a power piston having a front side moving wall disposed inside the front side pressure chamber for advancing and retreating movement with respect to the housing and dividing the front side pressure chamber into a first front chamber connected to the vacuum source and a first rear chamber selectively connected to the vacuum source or to the atmosphere, a rear side moving wall disposed inside the rear side pressure chamber for advancing and retreating movement with respect to the housing and dividing the rear side pressure chamber into a second front chamber connected to the vacuum source and a second rear chamber selectively connected to the vacuum source or to the atmosphere, and a valve housing attached to both of the moving walls; an input member disposed inside the valve housing for advancing and retreating movement with respect to the valve housing and movable by brake operation;

a valve mechanism disposed inside the valve housing and having a vacuum valve for connecting both of the rear chambers with both of the front chambers in correspondence with movement of the input member, and an atmospheric air valve for connecting both of the rear chambers with the atmosphere in correspondence with movement of the input member;

an output member for outputting outside the pressure generator a thrust force of the valve housing accompanying movement of the two moving walls;

an auxiliary moving wall disposed for advancing and retreating movement inside the first front chamber, the auxiliary moving wall including a part provided with a connecting passage;

an auxiliary variable pressure chamber bounded inside the first front chamber by the auxiliary moving wall and the first moving wall;

an air passage arranged coaxially with the valve housing and connected to the auxiliary variable pressure chamber by way of the connecting passage, the output member being positioned in the air passage:

switching means for selectively connecting the auxiliary variable pressure chamber with the vacuum source or the atmosphere;

a cylinder body having a cylinder bore and mounted in a front part of the housing; and a piston positioned in the cylinder bore and forming in front of the piston a pressure chamber, the piston being engageable with the output member and movable inside the cylinder bore along with movement of the auxiliary moving wall.

\* \* \* \* \*